United States Patent [19]

Ohnishi et al.

[11] Patent Number: 4,663,636

[45] Date of Patent: * May 5, 1987

[54] THERMAL TRANSFER PRINTING METHOD AND THERMAL HEAD USED IN METHOD THEREOF

[75] Inventors: Masaru Ohnishi; Masayuki Saito, both of Amagasaki, Japan

[73] Assignee: Mitsubishi Denki Kabushiki Kaisha, Tokyo, Japan

[ * ] Notice: The portion of the term of this patent subsequent to Jan. 8, 2002 has been disclaimed.

[21] Appl. No.: 676,333

[22] Filed: Nov. 29, 1984

[51] Int. Cl.$^4$ ............................................. G01D 15/10
[52] U.S. Cl. ............................... 346/76 PH; 346/106; 346/1.1; 400/120
[58] Field of Search ............... 346/76 PH, 76 R, 1.1, 346/106; 219/216 PH; 400/120; 250/317.1, 318, 319

[56] References Cited

U.S. PATENT DOCUMENTS

| | | | |
|---|---|---|---|
| 3,684,858 | 8/1972 | Buck | 219/543 |
| 4,360,818 | 11/1982 | Moriguchi et al. | 346/76 PH |
| 4,427,985 | 1/1984 | Kikuchi et al. | 346/1.1 |
| 4,492,965 | 1/1985 | Ohnishi et al. | 346/1.1 |
| 4,513,296 | 4/1985 | Svay et al. | 346/76 PH |

Primary Examiner—Arthur G. Evans
Attorney, Agent, or Firm—Lowe Price Leblanc Becker & Shur

[57] ABSTRACT

A thermal transfer printing method uses an ink sheet (12) having solid ink layers (11) whose optical reflection density is smaller than a maximum value of the optical reflection density of picture elements to be printed, and comprises the first step of printing the picture elements by moving a plain paper (4) and the ink sheet (12) in a forward direction (FW) so that the solid ink layers are transferred onto the plain paper (4), the second step of moving the plain paper (4) in a backward direction (BW) and the third step of transferring the solid ink layers (11) in an overlapping manner onto the picture elements printed in the first step, by moving the plain paper (4) and the ink sheet (12) again in the forward direction (FW). In the first and third steps, the solid ink layers (11) are completely transferred onto the plain paper (4). The gradation of the picture elements is determined by the number of transfer times. Therefore, each picture element in the gradation can be printed in an extremely stable manner with good reproducibility.

8 Claims, 26 Drawing Figures

FIG.17
|    | PE1 | PE2 | PE3 | PE4 | PE5 | PE6 | PE7 | PE8 |     |
|----|-----|-----|-----|-----|-----|-----|-----|-----|-----|
| OP | 0   | 1Do | 2Do | 3Do | 4Do | 5Do | 6Do | 7Do |     |
| BP1 | 0 | 1 | 0 | 1 | 0 | 1 | 0 | 1 | Do |
| BP2 | 0 | 0 | 1 | 1 | 0 | 0 | 1 | 1 | 2Do |
| BP3 | 0 | 0 | 0 | 0 | 1 | 1 | 1 | 1 | 4Do |
FIG.18
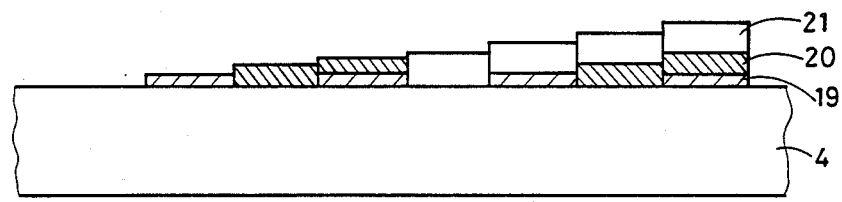
FIG.19
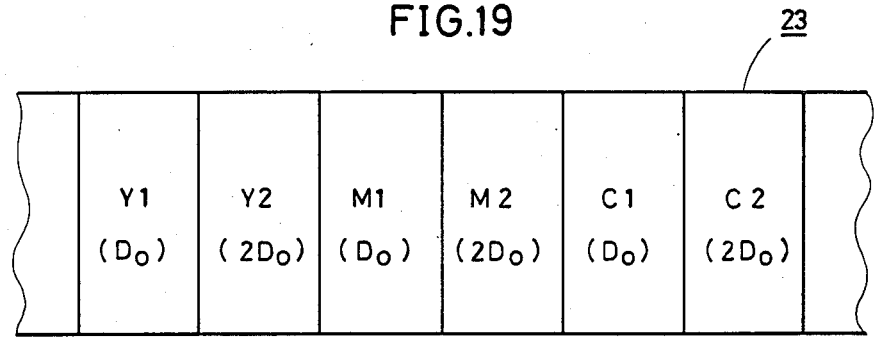

THERMAL TRANSFER PRINTING METHOD AND THERMAL HEAD USED IN METHOD THEREOF

BACKGROUND OF THE INVENTION

1. Field of the Invention

The present invention relates to a thermal transfer printing method in which an ink sheet including thermally transferable solid ink layers formed on a base film is used and the above described solid ink layers are heated by a thermal head and transferred onto a record medium so that a picture to be printed is decomposed into a plurality of picture elements to perform printing.

2. Description of the Prior Art

A thermal transfer printing method, as well as an ink jet printing method, has become noticed as one of the simple methods for printing on plain paper and for color printing, and recently has begun to be practically applied. As the thermal transfer method, two methods are known: one is a "melting transfer method" in which solid ink layers provided on a base film are heated and melted to be attached and printed onto plain paper, and the other is a "sublimation transfer method" in which sublimating dyes included in ink layers are sublimated or evaporated.

FIG. 1 is a schematic view showing a basic structure of a conventional melting transfer printing apparatus. A solid ink layer 2 having thermal transferability is provided on a base film 1 so that an ink sheet 3 is formed. The base film 1 is made of condenser paper, for example. The solid ink layer 2 is made of wax or organic resin binder and coloring agents. A thermal head 5 is provided on the side of the base film 1 of the ink sheet 3. A rubber roller 7 is provided on the side of the solid ink layer 2 of the ink sheet 3. Between the solid ink layer 2 and the rubber roller 7, plain paper 4 is provided. The thermal head 5 includes a plurality of heating resistors 6 in a dotted configuration, for example. When the heating resistors 6 of the thermal head 5 are supplied with electric current and heated, the solid ink layer 2 is heated and melted through the base film 1 of the ink sheet 3 and a melted portion 2A is transferred onto the plain paper 4. If either the magnitude (W/dot) of the voltage applied to the heating resistors 6 or the pulse width is changed, in principle the amount of the solid ink layer 2A to be transferred changes and it seems possible to perform gradation printing.

FIG. 2 is a graph showing a relation between the power applied to the thermal head and the optical reflection density OD of a printed picture element. In this case, the thermal head is one for use in facsimile and the size of the heating resistor is $80 \times 200$ $\mu m^2$. Referring to FIG. 2, the circles indicate averages of the values measured ten times and each bar indicates a range of scatter of the measured values. The pulse width of the heating current is 2 m sec. As is clear from the graph, the amount of scatter in measured values of the optical reflection density OD is extremely large when a picture element of an intermediate optical density is printed using a conventional ink sheet. As a result, using of the ink sheet which serves for melting transfer operation contains a disadvantage that a picture including picture elements whose optical densities are changed, that is, a gradation picture cannot be stably printed.

FIG. 3 is a schematic view showing a structure of a conventional ink sheet whereby three-value picture element optical densities can be obtained. A base film 1 is coated with a black solid ink layer 8 having a high melting point, which is further coated with a gray solid ink layer 9 having a low melting point. Thus, an ink sheet 10 for three-value printing is formed.

FIG. 4 is a conception view showing a state in which solid ink layers are transferred from the FIG. 3 ink sheet onto the plain paper 4. FIG. 4A shows a state in which only the gray solid ink layer 9 is transferred onto the plain paper 4. This transfer in FIG. 4A can be performed by selecting at temperature at which the gray solid ink layer 9 is melted but the black solid ink layer 8 is not melted. FIG. 4B shows a state in which both the black solid ink layer 8 and the gray solid ink layer 9 are transferred onto the plain paper 4. The transfer in this case can be performed by raising the temperature to a point at which the black solid ink layer 8 and the gray solid ink layer 9 are both melted. Thus, using the ink sheet 10 for three-value printing shown in FIG. 3, three-value optical densities for picture elements, that is, two optical densities shown in FIGS. 4A and 4B and the optical density in case where no transfer is made, can be obtained.

In theory, an ink sheet of more than three values can be formed if a large number of solid ink layers having different melting points are provided in an overlapping manner on the base film 1, but practically three values are the maximum limit for this kind of ink sheet. This is because on the low temperature side, a picture to be printed cannot be well fixed to the plain paper, and on the high temperature side, the heat resisting property of the thermal head is limited. In an ink sheet for three-value printing as described above, variation of the ambient temperature or variation of the heating temperature of a heating material due to repetition of printing operation, etc. increases instability such as blackening of a picture element to be colored gray. In addition, since two solid ink layers are superimposed on the base film, there is a disadvantage in that it is difficult to manufacture an ink sheet.

As a result, it is desired to provide a thermal transfer printing method capable of printing the elements in the gradation, stably and with excellent reproducibility.

A new method for thermal transfer printing is described in the copending U.S. patent application Ser. No. 494,283 now U.S. Pat. No. 4,492,965 filed May 13, 1983 by the inventors of the present application. The present invention makes an improvement of the method of this copending application and provides a thermal head to be employed in the method.

SUMMARY OF THE INVENTION

The present invention is, in brief, a thermal transfer printing method in which at least one ink sheet including at least one thermally transferable solid ink layer formed on a base film is used and the above described solid ink layer is heated by a thermal head and transferred onto a record medium so that picture elements of a picture to be printed are printed on the record medium. Each of the above stated picture elements is composed of a plurality of microstrips having an angle of 0° to 45° with respect to the line direction. The optical reflection density or said solid ink layer being smaller than a maximum value of the optical reflection density of said picture elements. A thermal transfer printing method of the present invention comprises at least three steps: a first step of printing at least one picture element out of said picture elements by moving said record medium and said ink sheet in a forward direction so that said solid ink layer is transferred onto said record medium, a second step of returning said medium in a state before said first step, and a third step of transferring said solid ink layer in an overlapping manner onto the picture elements printed in said first step, by moving again said medium and said ink sheet in the forward direction after said second step. The heating resistors of a thermal head to be employed for the thermal transfer each have a shape and a size adapted for the above stated microstrips.

In accordance with the present invention, in the above described first and third steps, the solid ink layer on the ink sheet is entirely transferred onto the record medium. The gradation of picture elements is determined by the number of transfer times. Contrary to a conventional method, in order to represent the gradation, it is unnecessary to transfer the picture elements with an intermediate optical density by controlling the voltage applied to the thermal head, nor to use a plurality of solid ink layers having different melting points. Therefore, in accordance with the present invention, it is made sure that all the picture elements included in the gradation can be printed in an extremely stable manner with excellent reproducibility.

Therefore, a primary object of the present invention is to provide a thermal transfer printing method capable of printing stably and with excellent reproducibility all the picture elements included in the gradation.

Another object of the invention is to provide a thermal head used in the above method.

A principal advantage of the present invention resides in that all the picture elements included in the gradation can be printed in an extremely stable manner with excellent reproducibility though an ink sheet inferior in gradation representation is used.

Another advantage of the present invention is that a thermal transfer printing method in accordance with the present invention can be applied to various printing apparatus such as a printer, facsimile and the like.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows a typical example of decomposition of an original picture to bit-plane pictures;

FIG. 18 shows typically a state of printing of picture elements showing eight-value optical reflection densitied;

FIG. 19 shows an ink sheet having a plurality of solid ink layers of different colors and different optical reflection densities;

DESCRIPTION OF THE PREFERRED EMBODIMENTS

Figure 5:
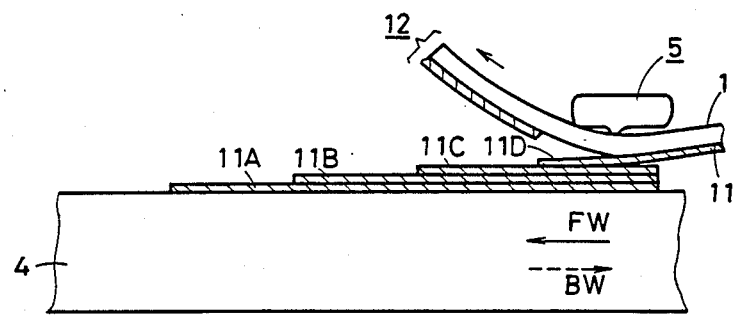
FIG. 5 is a basic principle view showing a printing method in accordance with the present invention.

FIG. 5 is a basic principle view showing a printing method in accordance with the present invention. Solid ink layers 11 having a low optical density are formed on a base film 1. The optical reflection density of the solid ink layers is approximately 1/n (n≧2) of a final picture density to be obtained. In the following, description is made assuming n=4. A thermal head 5 is provided on the side of the base film 1 of the ink sheet 11, and plain paper 4 is provided on the other side.

Printing of a gradation picture in accordance with the present invention will be made in the following manner. By moving the ink sheet 11 and the plain paper 4 in a forward direction FW, a first solid ink layer 11A is transferred to the plain paper 4 at the position of the thermal head 5. After that, the plain paper 4 returns in a backward direction BW. Then, the ink sheet 11 and the plain paper 4 are moved again in the forward direction FW, whereby a second solid ink layer 11B is transferred. In the same manner, a third solid ink layer 11C and a fourth solid ink layer 11D are transferred, and thus printing operation is completed. In this example, the optical reflection density OD of the solid ink layers 11 with low optical density is set to 0.4 in order that a maximum saturation density 1.6 can be obtained by four times of transfer.

Figure 6:
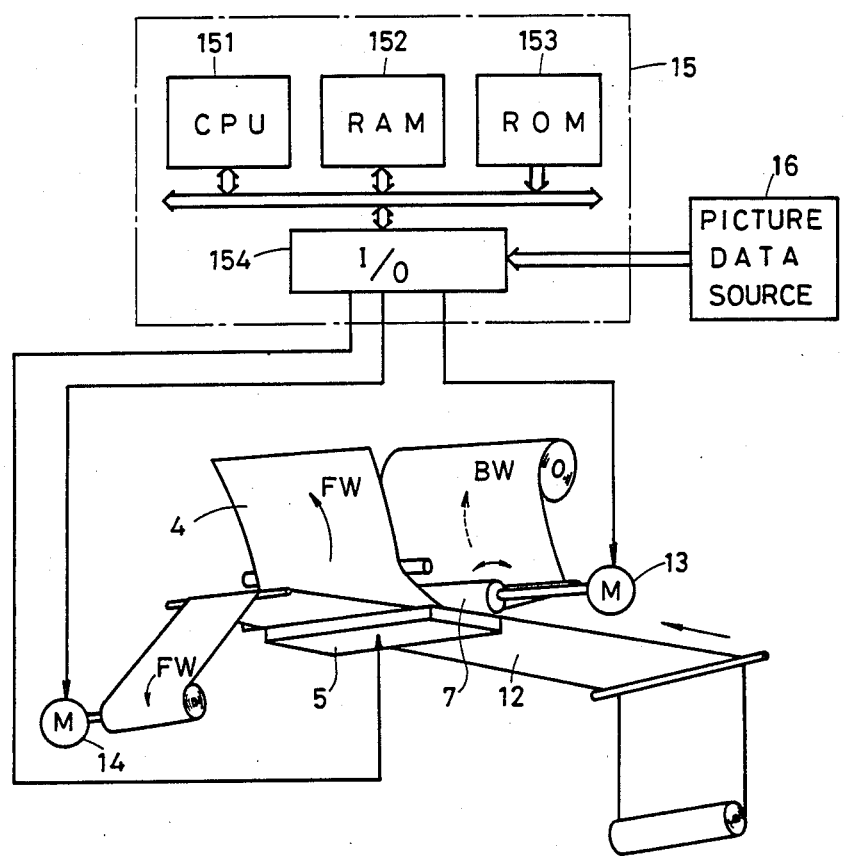
FIG. 6 is a conception view showing an apparatus in which a printing method of the present invention is embodied.

FIG. 6 is a schematic view showing an apparatus n which a printing method in accordance with the present invention is embodied. An ink sheet 12 of low optical density is wound in the forward direction FW by means of a motor 14 for ink sheet. A motor 13 for rubber roller makes a rubber roller 7 rotate in the forward direction and in the backward direction, so that the plain paper 4 is moved in the forward direction FW and in the backward direction BW. Under the rubber roller 7, a thermal head 5 is provided. This apparatus is controlled by a microcomputer 15. The microcomputer 15 comprises a central processing unit 151, a random access memory 152, a read only memory 153 and an input/output unit 154, which are connected with each other. The input/output unit 154 is connected with the motors 13 and 14 and the thermal head 5. Furthermore, a picture data source 16 is connected to the input/output unit 154. The motors 13 and 14 are, for example, pulse motors by which a rotational angle is controlled according to the number of pulses sent from the microcomputer 15 so as to determine the positions of the plain paper 4 and the ink sheet 12. The thermal head 5 contains heating resistors disposed in line in a dotted manner, as described below.

Figure 7:
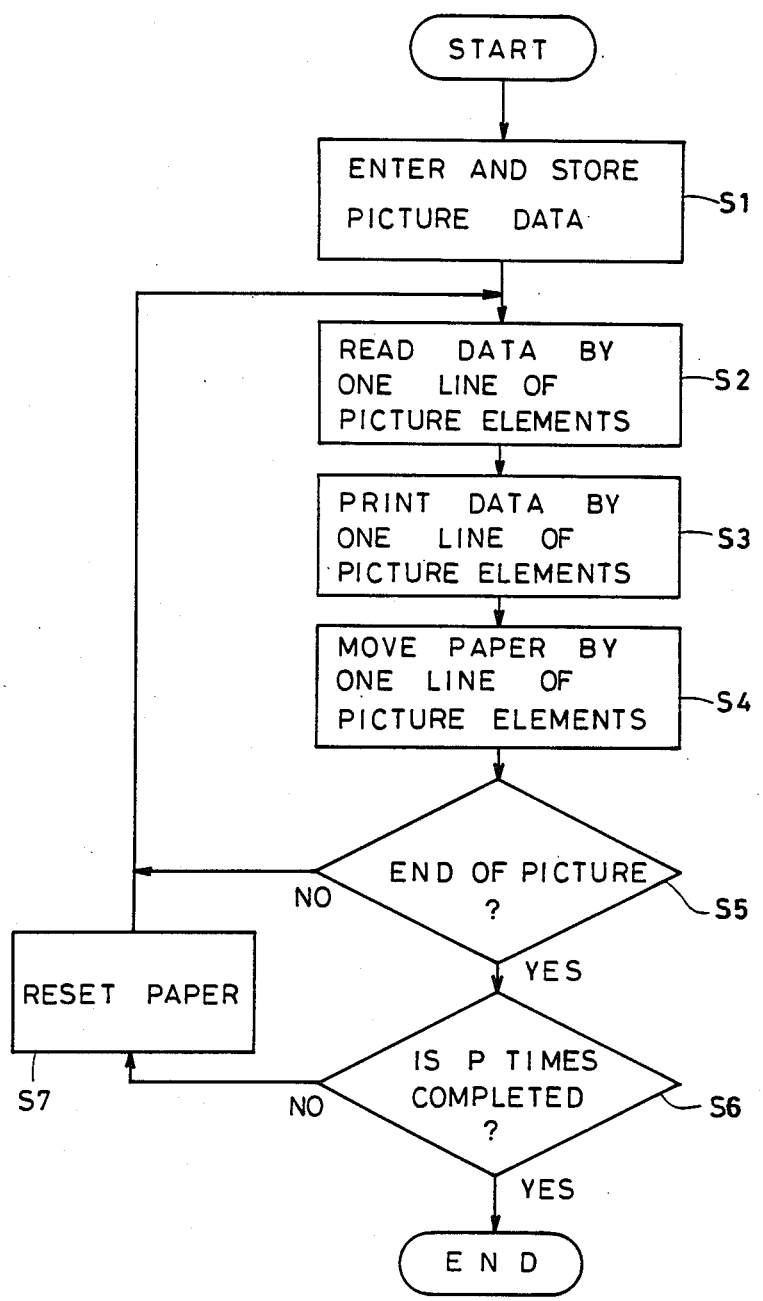
FIG. 7 is a flow chart showing the outline of operation of the apparatus shown in FIG. 6.

Now, the operation of the apparatus shown in FIG. 6 will be roughly described in the following. FIG. 7 is a flow chart showing the outline of the operation of the apparatus shown in FIG. 6. In the step S1, picture data to be printed is entered from the picture data source 16 into the microcomputer 15 and stored in the random access memory 152. In the step S2, an amount of data corresponding to one line of picture elements is read out from the random access memory 152 and in the step S3, the amount of picture data corresponding to the one line is printed on the plain paper 4. In the step S4, paper movement corresponding to one line of picture elements is carried out. In the step S5, it is determined according to the number of lines and other data memorized in the microcomputer 15 whether it comes to an end of the picture. If it comes to the end, the program proceeds to the step S6, and if not, returns to the step S2. In the step S6, it is determined whether transfer operation for P times is completed or not, and if it is completed, the program terminates, and if not, the program proceeds to the step S7. In the step S7, the plain paper 4 is reset in the initial position and the program returns to the step S2. Thus, transfer operation for P times is performed.

Figure 8:
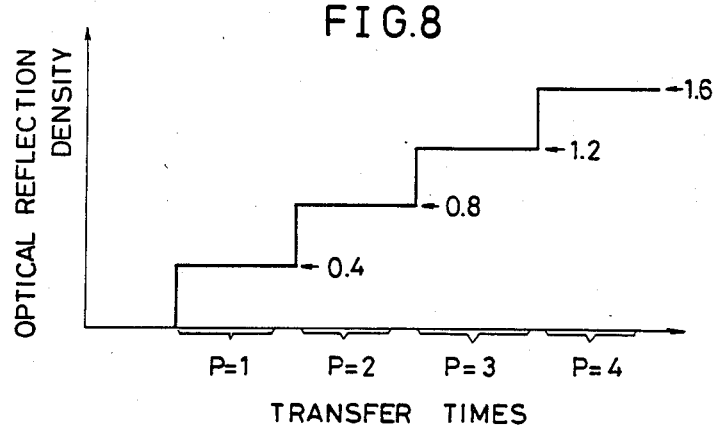
FIG. 8 is a graph showing a relation between the optical reflection density obtained by the printing method shown in FIG. 5 and the transfer times.

FIG. 8 is a graph showing a relation between the optical reflection density OD obtained by the printing method shown in FIG. 5 and the transfer times P. As is clear from the graph, printing is performed with five gradations in all based on a white ground and optical reflection densities 0.4, 0.8, 1.2 and 1.6. In the above described printing method, each of the solid ink layer 11 of low optical density is completely transferred from the ink sheet 12 of low optical density for each time of transfer operation and transfer is never controlled with an intermediate amount, which differs from a conventional method. Accordingly, the gradation is determined by the number of transfer times and the printing density of each gradation is extremely stable with excellent reproducibility.

Figure 9A:
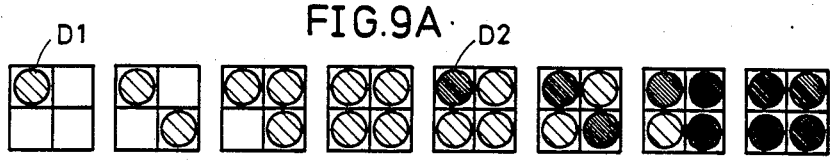
FIG. 9A shows picture elements composed of a group of a plurality of dots which were disclosed in the copending application.
Figure 9B:
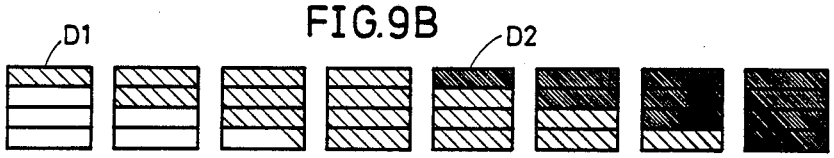
FIG. 9B shows picture elements composed a group of a plurality of dots in accordance with the present invention.

FIGS. 9A and 9B show picture elements composed of a group of a plurality of dots. In order to further increase the number of gradations, a picture element may be comprised of a dot matrix, so as to change the number of dots included in the dot matrix as well as the number of transfer times. FIG. 9A shows a case in which the dot matrix is a 2×2 dot matrix and transfer is performed two times in an overlapping manner (this case was disclosed in U.S. patent application Ser. No. 494,283 now U.S. Pat. No. 4,492,965). In FIG. 9A, the reference character D1 indicates a dot to which transfer is applied for one time and the reference character D2 indicates a dot to which transfer is applied twice in an overlapping manner. In this example nine gradations in all including a white level can be represented.

FIG. 9B shows a 1×4 dot matrix in accordance with the present invention. Although the dot matrix of FIG. 9A and that of FIG. 9B can represent the same number of gradations, the dot matrix of FIG. 9B presents various advantages to be described below.

Figure 10A:
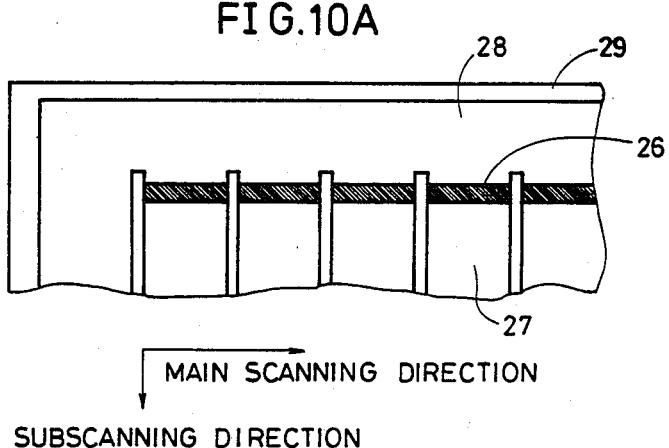
FIG. 10A shows a structure of a thermal head in accordance with the present invention.

FIG. 10A shows a structure of a thermal head to be employed for transfer of the 1×4 dot matrix of FIG. 9B. Each of the heating resistors 26 disposed in parallel with the line direction of picture elements (the main scanning direction) over the length of one line of picture element has a shape of a microstrip corresponding to one dot of the 1×4 dot matrix. To the heating resistors 26, electric power is selectively supplied through the respective individual electrodes 27 and the common electrode 28. These electrodes and heating resistors are formed on an insulating substrate 29 of ceramic or the like.

Figure 11:
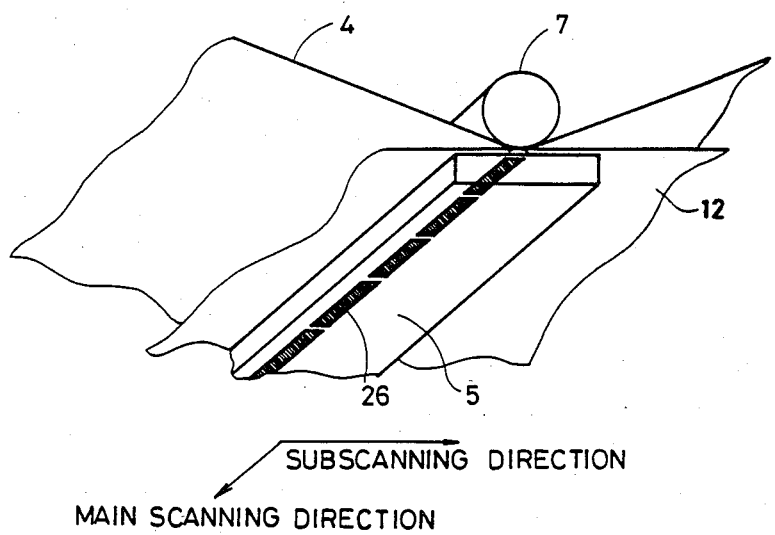
FIG. 11 shows the positional relation between the heating resistors in the thermal head of FIG. 10A and the rubber roller in FIG. 6.

FIG. 11 shows in an enlarged manner, a positional relation in case of such heating resistors being applied to the apparatus shown in FIG. 6. The heating resistors 26 are disposed in parallel with the axis of the rubber roller 7 (namely, in the main scanning direction) along the transversal direction of the paper sheet 4 so as to form one line of dots. This line of dots can be transferred by scanning the respective heating resistors 26 in the main scanning direction, or by scanning the resistors classified in several blocks, or by supplying electric power simultaneously to the selected resistors. When transfer of one line of dots is completed, the paper 4 and the ink sheet 12 are moved in the longitudinal direction (the subscanning direction) by a pitch amount of the line of dots so that transfer of the subsequent line of dots is performed. Thus, by transfer of four lines of dots, transfer of one line of picture elements as shown in FIG. 9B is completed.

Compared with the thermal head employed for the matrix of FIG. 9A, the thermal head employed for the matrix of FIG. 9B is advantageous in that an electrode pattern can be formed easily with high yield rate at low cost since the individual electrodes of the thermal head for the 1×4 matrix are formed to have a width twice as large as that of the individual electrodes for the 2×2 matrix. On the other hand, the narrowness of the microstrips of the heating resistors in the matrix of FIG. 9B does not involve so much difficulty in manufacturing. In addition, since in the structure of a thermal head, one drive device is required for each heating resistor 26, the thermal head for the 1×4 matrix needs a smaller number of drive devices, which further decreased the manufacturing cost. Thus, using the 1×n (n≧2) matrix in accordance with the present invention, various advantages can be obtained in a thermal head system.

Figure 10B:
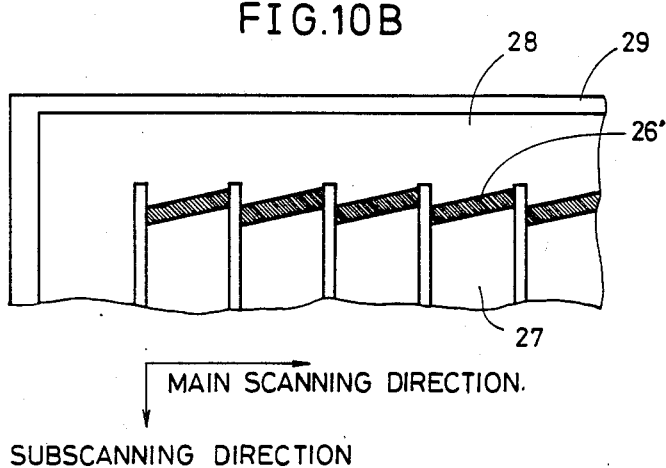
FIG. 10B shows a structure of another thermal head in accordance with the present invention.

In another embodiment of the present invention, microstrips of the heating resistors are inclined with respect to the main scanning direction (namely, the axial direction of the rubber roller 7) as shown in FIG. 10B. The contact between the rubber roller 7 and the heating resistors 26 is an important factor in the quality of printing. Accordingly, if the microstrips of the heating resistors 26 become narrow, it becomes important to precisely position the line of the heating resistors 26 in contact state with respect to the rubber roller. Using the inclined microstrips 26' of the heating resistors as shown in FIG. 10B, the contact between the rubber roller and the heating resistors can be made in a reliable manner and a good printing quality can be constantly obtained.

Figure 12:
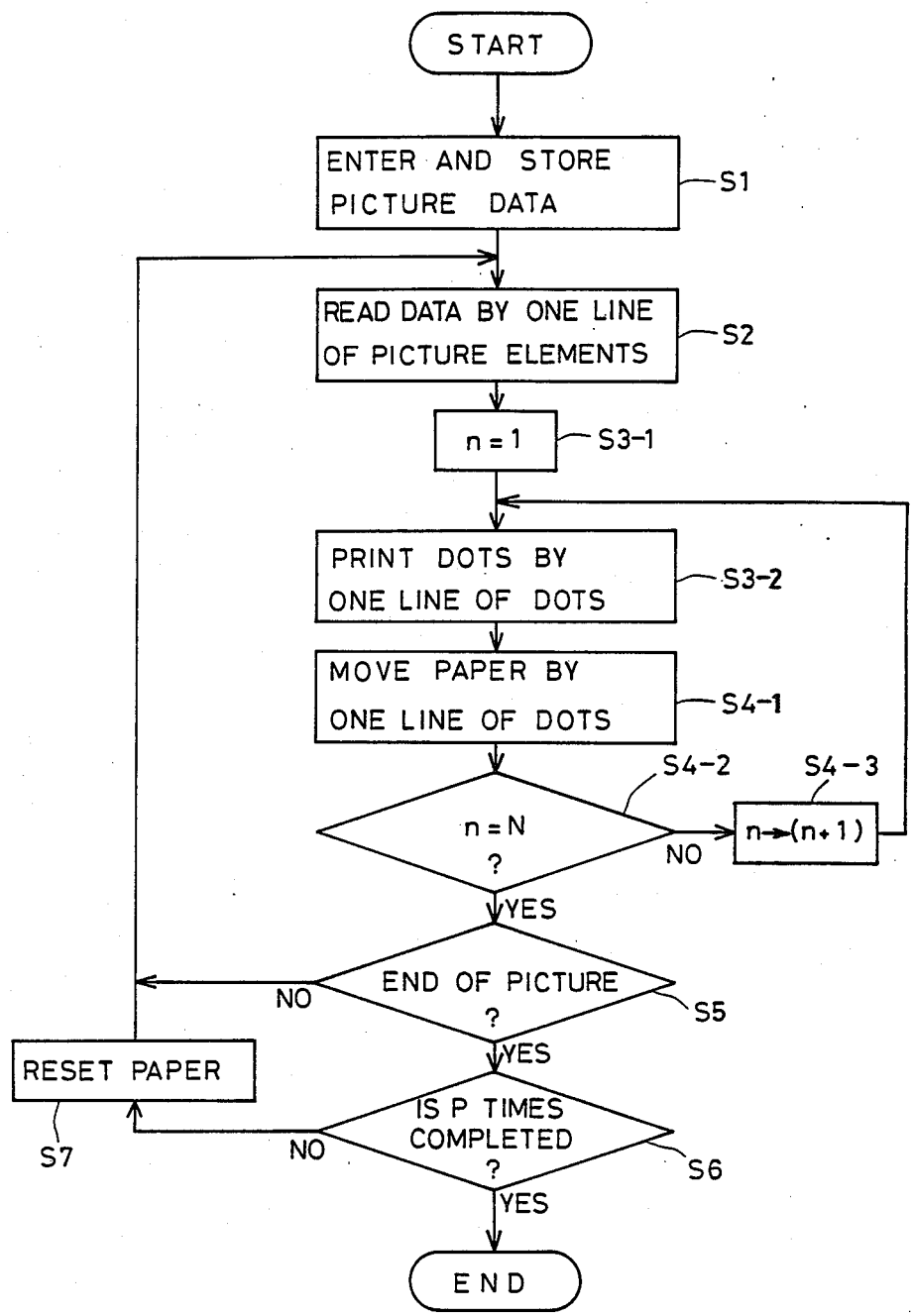
FIG. 12 is a more detailed flow chart showing the operation of the apparatus of FIG. 6 when the dot pattern of FIG. 9B is adopted.

FIG. 12 is a flow chart showing the outline of the scanning operation of FIG. 6 in case of using a thermal head shown in FIG. 10A or FIG. 10B. This flow chart shows in more detail the process corresponding to the steps S3 and S4 in FIG. 7, the other steps being the same as those in FIG. 7. In FIG. 12, after the data for one line of picture elements is read out in the step S2, the first line of dots n=1 in the line of picture elements is set in the step S3-1. In the step S3-2, the first line of dots is transferred on the plain paper 4. In the step S4-1, the paper is moved by one line of dots. In the step S4-2, it is determined based on the number N of lines of dots preset in the microcomputer 15 (N=4 in the case of FIG. 9B) whether the last line of dots in the line of picture elements was transferred or not. If the last line of dots is not transferred, the next line of dots (n+1) is set in the step S4-3 and the program returns to the step S3-2. When n=N is attained by repeating this operation, printing for one line of picture elements is completed and the program proceeds to the step S5. In the step S5, it is determined whether the line thus ended comes to an end of the picture or not. If not, the program returns to the step S2. The subsequent operation is the same as in FIG. 7.

Figure 13:
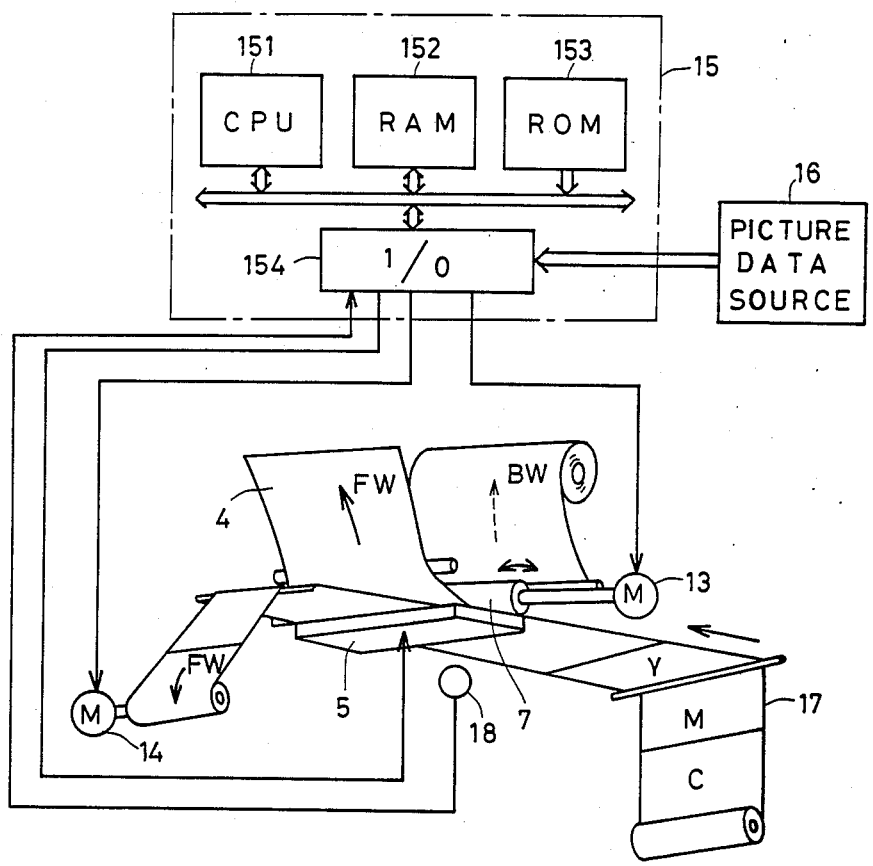
FIG. 13 is a schematic view showing an apparatus in which a color thermal transfer printing method of the present invention is embodied.

Next, description will be made of a case in which a thermal transfer printing method in accordance with the present invention is applied to the printing of a color picture. FIG. 13 is schematic view showing an apparatus in which a color thermal transfer printing method is embodied. The following description is given principally for the purpose of clarifying the different points from the apparatus shown in FIG. 6. In an ink sheet 17 for color printing, a plurality of solid ink layers of different colors are individually formed in the divided regions on the base film. In this example, an ink sheet 17 for color printing comprises a yellow color solid ink layer, a magenta color solid ink layer and a cyanic color solid ink layer. Under the ink sheet 17, a color sensor 18 is provided. The color sensor 18 is connected to the microcomputer 15.

Figure 14A:
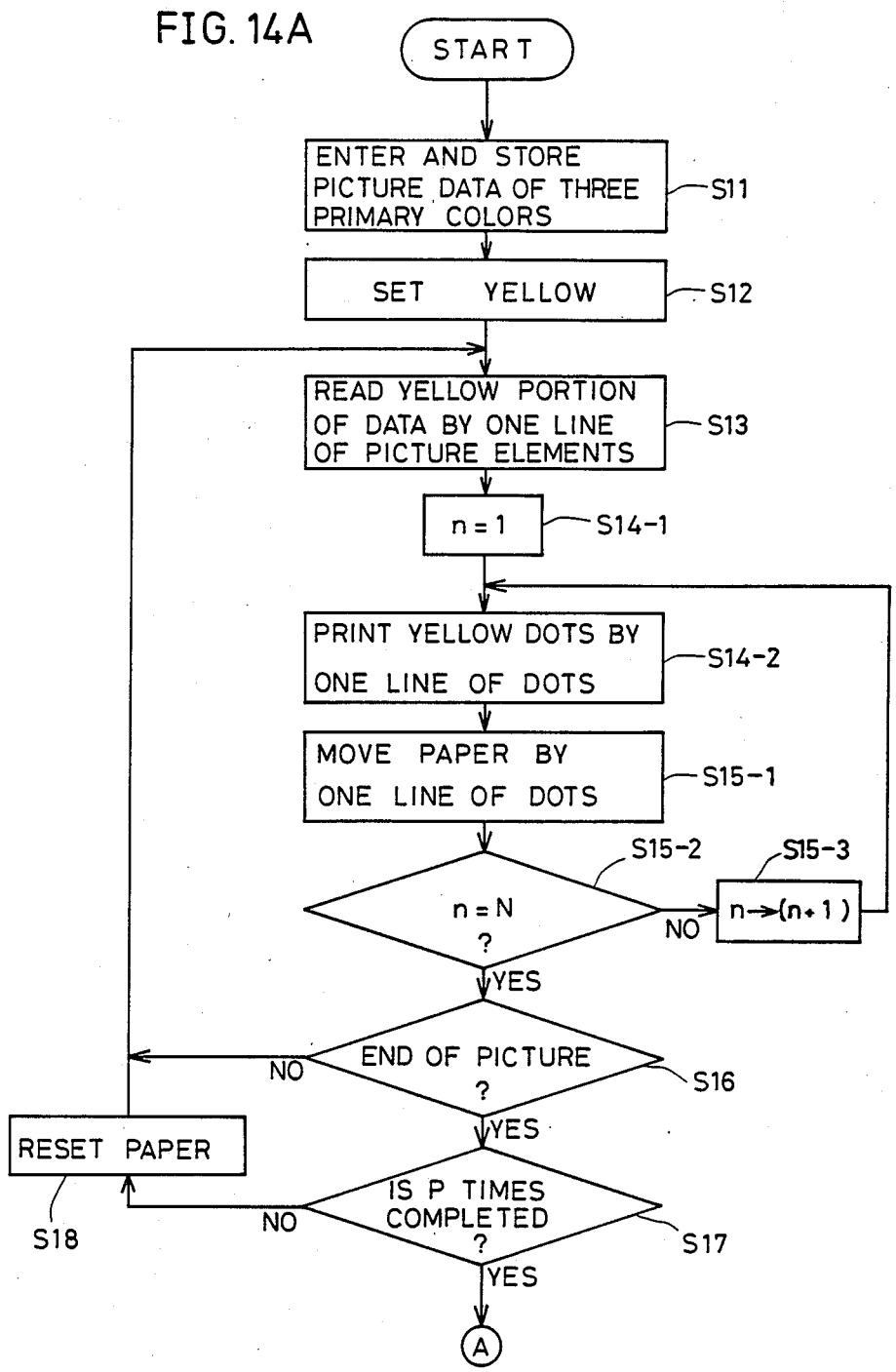
FIGS. 14A and 14B are flow charts showing the operation of the apparatus shown in FIG. 13.

The operation of the apparatus shown in FIG. 13 will be described in the following. FIG. 14A is a flow chart showing briefly the operation of the apparatus shown in FIG. 13. In the step S11, picture data of three primary colors (yellow, magenta and cyanic color) is entered from the picture data source 16 into the microcomputer 15 so as to be stored. In the step S12, the yellow portion out of the ink sheet is set to predetermined transfer position. This set state is detected by the color sensor 18. In the steps S13 to S18, the same operation as in the steps S2 to S7 in FIG. 12 is performed, and the description thereof is omitted. In the step S17, when it is determined that transfer for P times is completed, the program proceeds to the step S19. In the step S19, the magenta portion out of the ink sheet is set to a predetermined transfer position, and the set state is detected by the color sensor 18. The operation in the step S20 is the same as the operation in the steps S13 to S18. In the step S21, the cyanic color portion of the ink sheet is set to a predetermined transfer position, and this set state is detected by the color sensor 18. The operation in the step S22 is the same as that in the steps S13 to S18. Thus, a colored picture with a plurality of gradations is printed.

Figure 15:
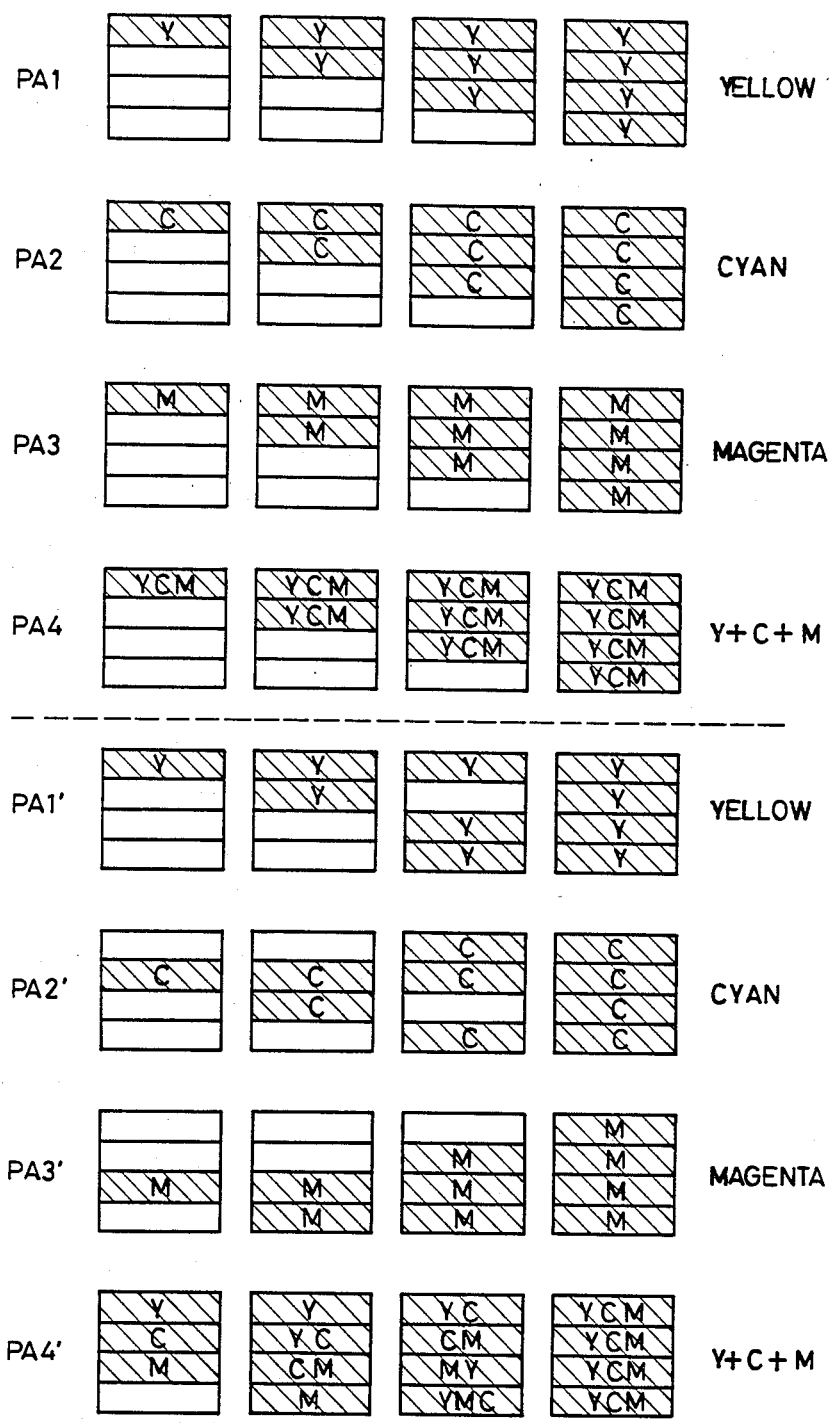
FIG. 15 shows picture elements composed of a group of a plurality of dots of different colors.

FIG. 15 shows picture elements each of which comprises a group of a plurality of dots of different colors. In this example, a yellow picture element arrangement PA1, a cyanic color picture element arrangement PA2 and a magenta picture element arrangement PA3 have respectively one to four gradations. If transfer is twice performed in an overlapping manner similarly to the case of FIG. 9B, gradations can be obtained. The picture element arrangements PA4 and PA4' are obtained when the three colors as arranged in PA1 to PA3 and PA1' to PA3' are transferred in an overlapping manner, respectively. As is understood from the drawings, the color dots in the low optical density region are made not to be overlapped with each other in the picture element arrangement PA4'. On the contrary, in the picture element arrangement PA4, the color dots in the low optical density region are overlapped with each other. As clear from the comparison of the picture element arrangements PA4' and PA4, the number of dots in the low optical density region for representing the same gradation is larger in PA4', and accordingly the picture element arrangement PA4 ' has an advantage that the resolution is less deteriorated.

Figure 14A:
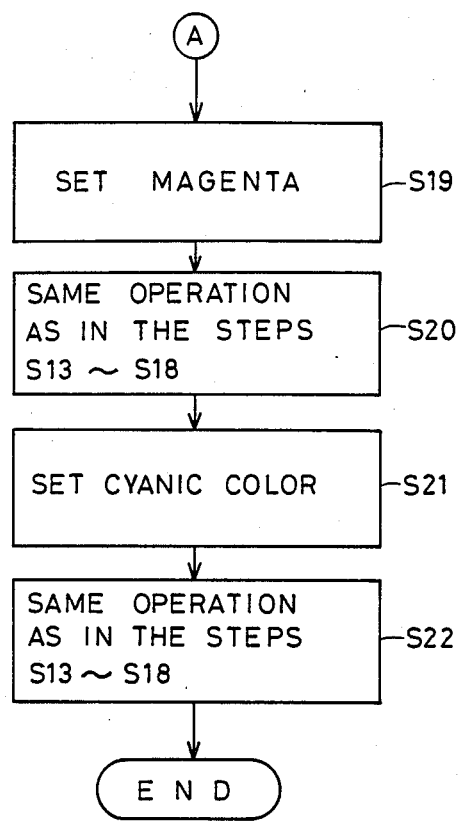
Figure 14B:
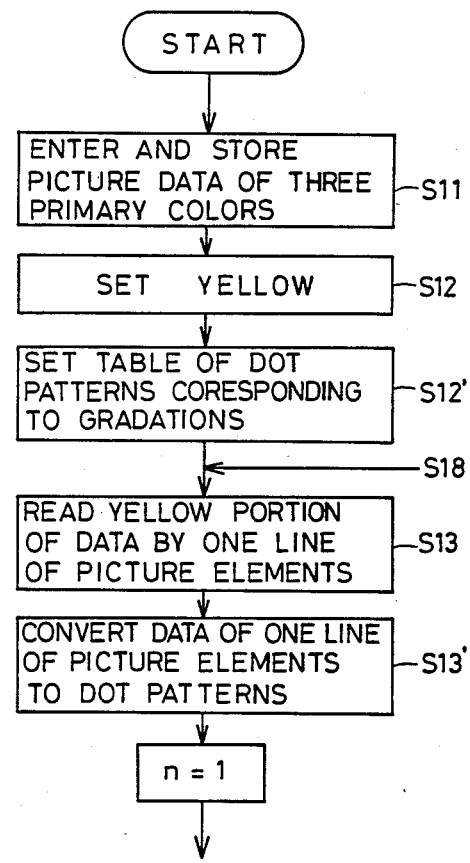

The picture element arrangement such as PA4' can be printed by steps in a modified flow chart similar to that of FIG. 14A. FIG. 14B shows only a part of such modified flow chart. In the modified flow chart, the whole steps of FIG. 14A should be reproduced with the additional steps S12' and S13'. In the step S12', a table of dot patterns such as PA1', PA2' and PA3' corresponding to gradations is set. In the step S13', the read data of one line of picture elements are converted to dot patterns based on the table of dot patterns.

In the above described embodiment, only a method using an ink sheet coated simply with solid ink layers of low optical density was described. However, if ink layers of low optical density and ink layers of high optical density of a different color are separately formed on a common ink sheet and only the color of the low optical density ink layers is made to have gradation, several limited colors can be printed with a decreased number of transfer times.

According to a method as described above in which transfer is made for a plurality of times using an ink sheet of low optical density, there might be a few problems that because of an increased number of transfer times, the printing period becomes longer and the area of an ink sheet to be used is made larger. For the purpose of dissolving such problem, another embodiment in which a larger number of gradations can be represented with limited transfer times will be described in the following. This method is referred to as a bit-plane multiplex printing method.

Figure 16:
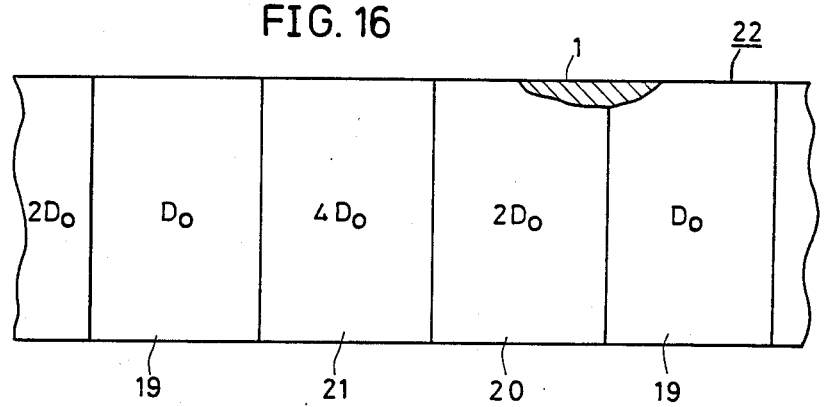
FIG. 16 shows an ink sheet having three solid ink layers of different optical reflection densities.

FIG. 16 shows an ink sheet 22 for multiplex printing having solid ink layers of three kinds with different optical reflection densities. Solid ink layers 19 to 21 of N kinds, three in this case, having different optical reflection densities are individually formed on the divided regions of the base film 1. The optical reflection density of the first solid ink layer 19 is DA, the optical reflection density of the second solid ink layer 20 is DB and the optical reflection density of the third solid ink layer 21 is DC. Assuming that the density DA of the solid ink layer 19 is $D_0$, the densities DA, DB and DC of the respective solid ink layers are made to satisfy almost exactly the following equation:

$$DA:DB:DC = 1D_0:2D_0:4D_0 \quad (1)$$
$$= 2^0:2^1:2^2$$

In order to sufficiently make use of the characteristics of the present invention described hereinafter, the relation of the equation (1) must be established almost exactly. As an example, $D_0$ is set to 0.25 as a value of optical reflection density. In consequence, the densities DA, DB and DC are respectively 0.25, 0.5 and 1.0.

FIG. 17 shows an typical example of decomposition of an original picture to bit-plate pictures. In this case, the original picture OP has eight gradations in all O, $D_0$, ..., $7D_0$, for example. The picture elements PE1, PE2, ..., PE8 in the original picture OP have respectively optical reflection densities O, $1D_0$, ..., $7D_0$. According to a conventional method in which solid ink layers of a single optical density are overlapped, it is necessary to perform printing operation seven times in order to print such an original picture OP. In addition, according to a conventional method using solid ink layers having different melting points, it is necessary to perform transfer operation in the printing conditions of seven types. In this embodiment, contrary to the above mentioned conventional methods, the original picture OP can be printed with a decreased number of printing times as described below.

First, the original picture OP is decomposed into three pictures BP1, BP2 and BP3. The picture BP1 having an optical reflection density $D_0$ is a two-value picture of "1" (transfer) or "0" (no transfer). Similarly, the pictures BP2 and BP3 respectively have optical reflection densities $2D_0$ and $4D_0$ and are two-value pictures. The above described pictures BP1 to BP3 are referred to hereinafter as bit-plane pictures. The bit-plane pictures shown in FIG. 14 have combinations of picture elements corresponding to the original picture OP. For example, optical reflection densities $3D_0$ and $7D_0$ and be obtained by the following equation:

$$\left.\begin{array}{l} 3D_0 = D_0 + 2D_0 \\ 7D_0 = D_0 + 2D_0 + 4D_0 \end{array}\right\} \quad (2)$$

Thus, with a combination of three bit-plane pictures, picture element densities of $2^3=8$ gradations can be obtained. More particularly, by transferring the bit plane pictures of three kinds of optical density, a picture having eight density levels can be printed.

Accordingly, to the above described method, in general following relation is established:

$$MS=2^N$$

where N indicates the number of optical reflection densities of the solid ink layers and MS indicates the maximum number of picture element densities obtained by this method.

In such a case, in order that the picture printed by this method may have the best quality, it is preferred to fulfill the following conditions:

(1) Density levels of the picture elements of the N sheets of but-plane pictures can be obtained stably and a relation of $D_0 \times 2^N$ is maintained between the respective density levels.

(2) The sum of the bit-plane pictures becomes a sum of picture element densities as obtained by the equation (2).

Figure 1:
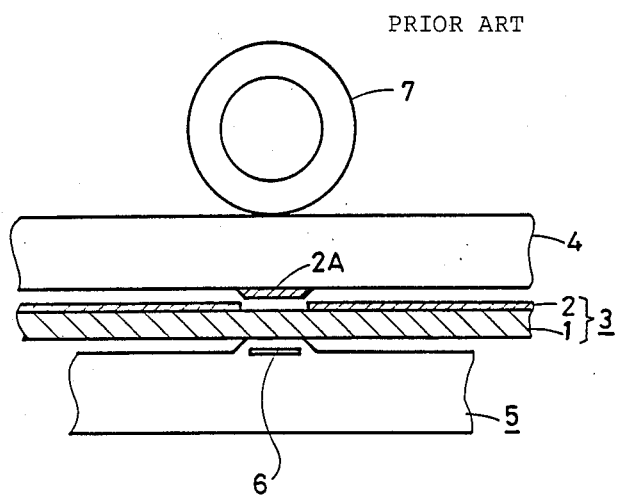
FIG. 1 is a schematic view showing a fundamental structure of a conventional melting transfer printing apparatus.
Figure 2:
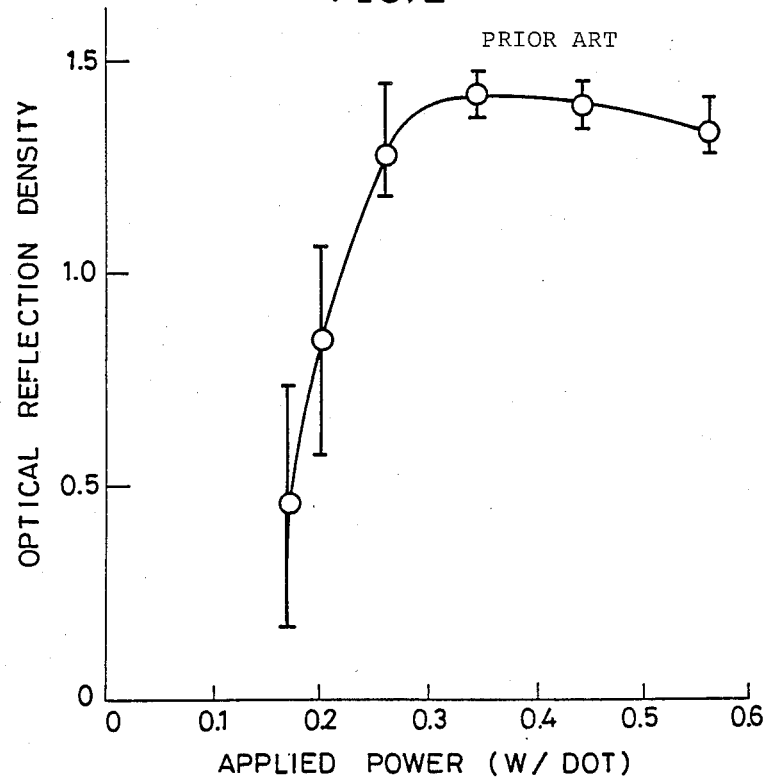
FIG. 2 is a graph showing a relation between the power applied to a thermal head and the optical reflection density of a printed picture element.
Figure 3:
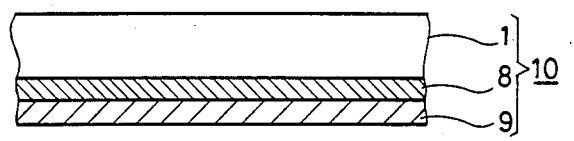
FIG. 3 is a schematic view showing a structure of a conventional ink sheet by which three-value picture element optical densities can be obtained.
Figure 4A:
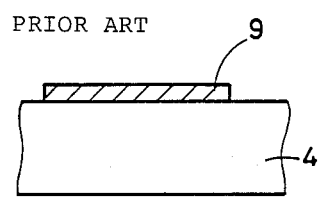
FIGS. 4A and 4B are conception views showing a state in which solid ink layers are transferred onto plain paper using the ink sheet shown in FIG. 3.
Figure 4B:
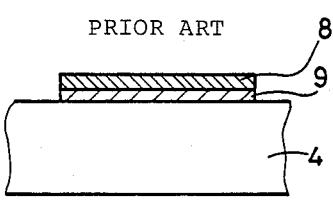

The first condition can be fulfilled in accordance with this embodiment, when an ink sheet for multiplex printing including a plurality of solid ink layers with different optical densities as shown in FIG. 16 is used and the state in which the solid ink layers are completely transferred is set to "1" and the state in which no transfer is made is set to "0". In such a method, contrary to a conventional heat sensitive printing method or a conventional thermal transfer printing method shown in FIGS. 3 and 4, printing an intermediate state is not needed, and accordingly the picture element densities are extremely stable. Thus, the above described first condition can be satisfied.

The second condition can be fulfilled, in the embodiment, when the optical reflection densities obtained by repetition of transfer are given as sum of the bit-plane pictures. This is because the transfer condition of each bit-plane picture can be maintained the same. As a method can satisfy simultaneously the above described first and second conditions, at present, there does not seem to be any other method than the method of this embodiment using ink sheets of the same kind or several kinds having solid ink layers of different optical densities.

FIG. 18 shows a model of state in which picture elements having eight-value optical reflection densities are printed. In this example, the ink sheet 22 for multiplex printing shown in FIG. 16 is used and the bit-place pictures BP1 and BP3 shown in FIG. 17 are overlapped in order. More particularly, the first to third solid ink layers 19 to 21 having different optical densities in accordance with the picture element densities of a picture to be represented are transferred in an overlapping manner. As is clear from the drawing, with a combination of solid ink layers of three kinds, picture element densities of $2^3=8$ gradations are provided. An apparatus in which the above described method is applied is similar to the apparatus shown in FIGS. 6 and 13.

In accordance with the above described method, in principle, the gradation representation range of a picture element per se can be remarkably enlarged, if a large number of different solid ink layers are used. More particularly, when solid ink layers of N kinds are used and the optical relfection density $D_M$ of the respective layers satisfied the following equation, picture element densities of $2^M$ gradations can be obtained.

$$D_M = 2^{M-1} \cdot D_0$$

where M is an integer number satisfying the condition $1 \leq M \leq N$ and $D_0$ is the minimum value of the optical reflection densities of the above described solid ink layers of N kinds. For example, if solid ink layers of eight kinds are used, picture element densities of 256 gradations can be obtained. Accordingly, in this embodiment, transfer operation has only to be performed eight times and the period for printing a picture can be remarkably reduced, while in accordance with a conventional method, transfer in different 255 conditions has to be made in order to obtain picture element densities of 256 gradations.

A set value $D_M$ of each density level of an ink sheet constituting a bit-plane picture must satisfy the above described equation (4) in order that the density levels of the respective picture elements of a picture to be obtained may be provided at an equal interval. However, if the density levels are not provided at an equal interval, a desired gradation picture can be printed with a small number of transfer times, as described below. More particularly, if in a plurality of optical densities of the ink sheet, there exists a relation in which a certain density cannot be obtained by a combination of other plural number of densities, the number of gradations S becomes maximum with respect to the number of printing times P. As result, by printing operation for P times, a picture having picture element densities of $S=2^P$ gradations at maximum can be obtained. However, if there are solid ink layers of K kinds having the same density out of the solid ink layers of N kinds, the number of gradations S to be obtained is represented by the following equation and the number of picture element densities to be obtained is decreased.

$$S = \sum_{r=K}^{r=n} \frac{N!}{(N-r)!r!}$$

Nevertheless, as far as the relations S>N is maintained, there is a merit that printing can be made with a smaller number of transfer times than the number of gradations S. In addition, in this case, it is not necessarily needed to use an ink sheet including a plurality of solid ink layers of different densities provided on the same base film as shown in FIG. 16. Separate ink sheets of different densities may be used.

On the other hand, most preferably, the density levels of the respective solid ink layers satisfy the condition of the equation (4), but in practice the optical density of the overlapped solid ink layers sometimes does not coincide with the sum of all the optical densities, and accordingly, even if its value may be changed to the extent that the following equation is fulfilled, a gradation picture can be formed.

$$D_M = (2+\alpha)^{M-1} \cdot D_0 \tag{6}$$

where $\alpha$ is a number satisfying the condition $$-0.5 \leq \alpha \leq +0.5.$$

Figure 20:
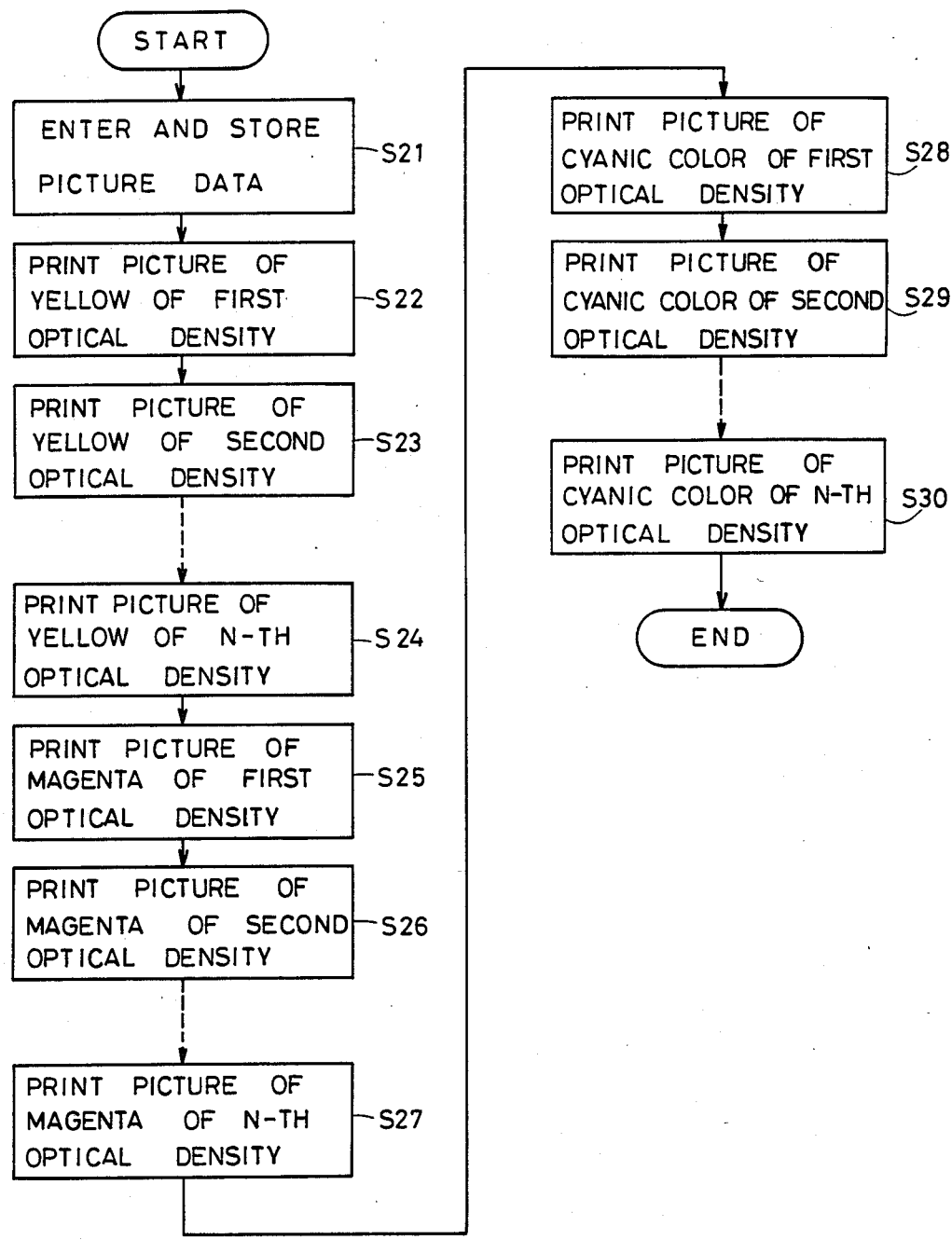
FIG. 20 is a flow chart showing color multiplex printing operation.
Figure 21:
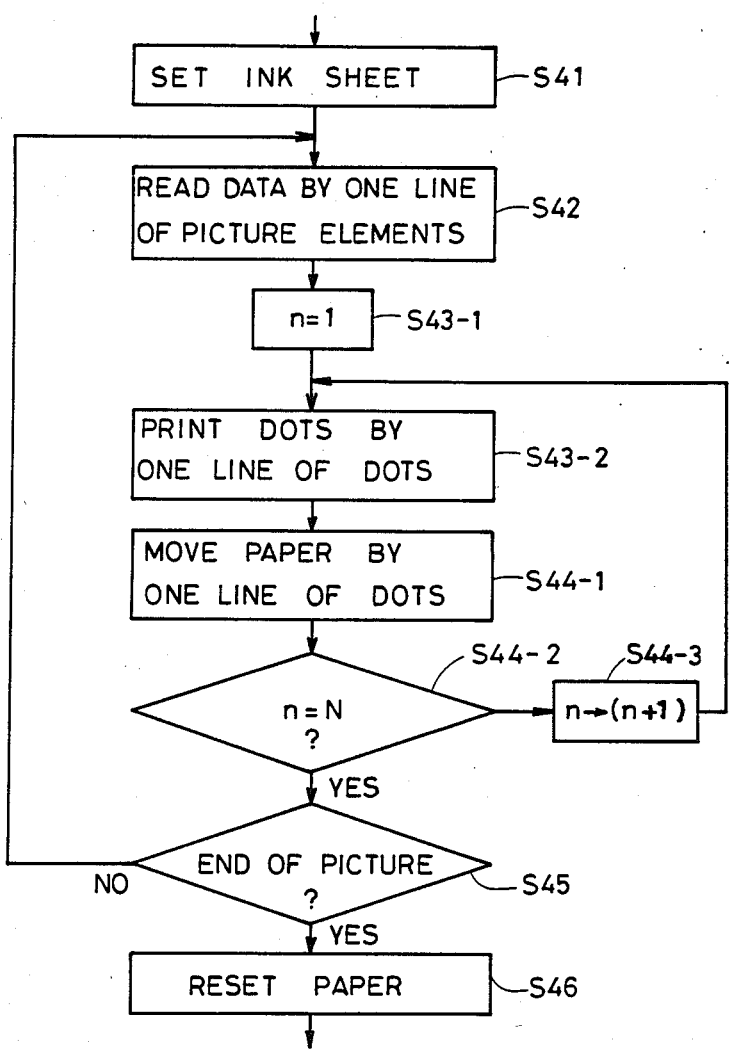
FIG. 21 is a flow chart showing operation of one portion of FIG. 20.

In the above description, a monochromatic example was given. However, multiple colors can be easily applied by using an ink sheet having a plurality of solid ink layers of different colors and different optical reflection densities. FIG. 19 shows an ink sheet 23 for color multiplex printing having a plurality of solid ink layers of differnet colors and different optical reflection densities. This ink sheet 23 includes solid ink layers of three primary colors, which are yellow, cyanic color and magenta. These colors have respectively optical reflection densities $D_0$ and $2D_0$. The following description will be made of the operation in case where color multiplex printing is performed using such an ink sheet. FIG. 20 is a flow chart showing the color multiplex printing operation. FIG. 21 is a flow chart showing the operation of one poriton in FIG. 20. In the step S21, picture data is entered from the above mentioned picture data source 16 into the microcomputer 15 and stored. In the step S22, a picture of yellow of the first optical density is printed. In the step S23, a yellow picture of the second optical density is printed. Then, similar operation is repeated in the subsequent steps. In the step S24, a yellow picture of the N-th optical density is printed. Operation in the steps S25 to S30 is similarly to the above described operation. Internal operation in each of the steps S22 to S30 is shown in FIG. 21. More particularly, in the step S41, an ink sheet of a certain color of a certain optical density is set. In the step S42, an amount of data corresponding to one line of picture elements is read out from the microcomputer, and in the step S43-2, the data is printed on the plain paper. In the step S44-1, the paper is moved by an amount corresponding to one line of dots. In the step S45, it is determined whether is comes to the end of the picture, and if if comes to the end, the program proceeds to the step S46 in which the plain paper is reset to the initial position. If it does not come to the end, the program proceeds to the step S42.

In the foregoing, some embodiments of the present invention were described in detail. Although in the above description, only an example in which the optical density of a picture element per se is changed is given, a pseudo-gradation reproducing method such as a Dither method or a density pattern method or the like may be simultaneously used for the purpose of increasing the gradation reproducing ability. In addition, the combination of colors may not be limited to the combination of yellow, cyan color and magenta. A combination of orange, green and blue or the like may be applied. As an ink material, not only material wax type but also organic resin binder may be used. As coloring agents, either pigments or dyes may be used. The ink sheet is provided preferably with solid ink layers of thermal melting property on the base film, but it may be provided with solid ink layers having thermal sublimation property. The base film is preferably a condenser paper or a plastic film but is not limited to the above described material as far as it is a thermally transferable material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermal transfer printing method using at least one ink sheet provided with at least one thermally transferable solid ink layer formed on a base film as a donor medium, said solid ink layer being heated and transferred onto a record medium whereby picture elements of a picture to be printed are scanned and printed on said record medium, the otical reflection density of said solid ink layer being smaller than the maximum value of the optical reflection density of said picture elements, said scanning including main scanning and subscanning, each of said picture elements being divided in a plurality of dots in the shape of a microstrip having an angle in the range of 0° to 45° with respect to the main scanning direction, said method comprising at least:

a first step of providing a thermal head comprising heating resistors having a shape and a size adapted for said microstrips, said heating resistors being disposed in line in said main scanning direction, a second step of printing selected dots out of said dots by scanning said heating resistors in said main scanning direction and by moving said record medium and said ink sheet in said subscanning direction so that said solid ink layer is transferred onto said record medium, a third step of returning said record medium in a state before said second step, and a fourth step of transferring said solid ink layer in an overlapping manner to the selected dots out of the dots printed in said second step, by scanning said heating resistors in said main scanning direction and by moving said record medium and said ink sheet in said subscanning direction.

2. A thermal transfer printing method in accordance with claim 1, wherein:

in said ink sheet, a plurality of solid ink layers of different colors are individually formed in the divided regions on said base film, in said second step, one solid ink layer of one color out of said plurality of solid ink layers is tranferred so that selected dots out of said group of dots are printed, in said fourth step, the same solid ink layer as in said second step is transferred so that other dots are transferred in such a manner as to be overlapped to selected dots out of the dots printed in said second step, and with respect to other solid ink layers of other colors out of said plurality of solid ink layers, the same operation as in said second and fourth steps is successively performed.

3. A thermal transfer printing method in accordance with claim 1, wherein:

in said ink sheet, solid ink layers of N kinds having different optical reflection densities are individually formed in the divided regions on said base film, N being a positive integer number, in said second step, solid ink layer of the first kind is transferred, and in said fourth step, solid ink layer of the second kind is transferred.

4. A thermal transfer printing method in accordance with claim 3, wherein:

the optical reflection density $D_M$ of said solid ink layers of N kinds is represented by the following equation:

$$D_M = (2+\alpha)^{M-1} \cdot D_0$$

where M is an integer number satisfying the condition $1 \leq M \leq N$, $\alpha$ is a number satisfying the condition $-0.5 \leq \alpha \leq +0.5$ and $D_0$ is the smallest value of the optical reflection densities of said solid ink layers of N kinds.

5. A thermal transfer printing method in accordance with claim 3, wherein:

in said ink sheet, a plurality of solid ink layers having different colors and different optical reflection densities are individually formed in the divided regions on said base film, the optical reflection densities for the respective colors being of N kinds, in said second step, one solid ink layer of at least one color out of said plurality of solid ink layers is transferred so that selected dot out of said group of dots is printed, in said fourth step, another solid ink layer of the same color as in said second step is transferred so that other dotes are transferred in such a manner as to be overlapped to selected dots out of the dots printed in said second step, and with respect to the remaining solid ink layers of other colors and other optical reflection densities out of said plurality of solid ink layers, the same operation as in said second and fourth steps is successively performed.

6. A thermal transfer printing method in accordance with claim 5, wherein:

said optical reflection density $D_M$ of N kinds is represented by the following equation:

$$D_M = (2+\alpha)^{M-1} \cdot D_0$$

where M is an integer number satisfying the condition $1 \leq M \leq N$, $\alpha$ is a number satisfying the condition $-0.5 \leq \alpha \leq +0.5$ and $D_0$ is the smallest value of said N kinds of optical refection density.

7. A thermal transfer printing method in accordance with claim 1, wherein:

ink sheets of N kinds including solid ink layers of different optical reflection densities are used, N being a positive integer number, in said second step, one solid ink layer on the ink sheets of the first kinds is transfered, and in said fourth step, another solid ink layer on the ink sheets of the second kind is transferred.

8. A thermal transfer printing method in accordance with claim 7, wherein:

the optical reflection density $D_M$ of the solid ink layers on said ink sheets of N kinds is represented by the following equation:

$$D_M = (2+\alpha)^{M-1} \cdot D_0$$

where M is an integer number satisfying the condition $1 \leq M \leq N$, $\alpha$ is a number satisfying the condition $-0.5 \leq \alpha \leq +0.5$ and $D_0$ is the smallest value of the optical reflection densities of the solid ink layers on said ink sheets of N kinds.

* * * * *